US012761715B2

(12) United States Patent
Hua et al.

(10) Patent No.: US 12,761,715 B2
(45) Date of Patent: Oct. 13, 2026

(54) POWER SUPPLY METHOD AND DEVICE FOR STORAGE ARRAY, AND SERVER

(71) Applicant: SUZHOU METABRAIN INTELLIGENT TECHNOLOGY CO., LTD., Suzhou (CN)

(72) Inventors: Yaoyu Hua, Suzhou (CN); Ruijie Wang, Suzhou (CN); Xuetao Cui, Suzhou (CN); Lupan Wang, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 219 days.

(21) Appl. No.: 18/712,222

(22) PCT Filed: Nov. 22, 2022

(86) PCT No.: PCT/CN2022/133473
§ 371 (c)(1),
(2) Date: May 21, 2024

(87) PCT Pub. No.: WO2023/185016
PCT Pub. Date: Oct. 5, 2023

(65) Prior Publication Data

US 2025/0004524 A1 Jan. 2, 2025

(30) Foreign Application Priority Data

Mar. 29, 2022 (CN) ......................... 202210315458.0

(51) Int. Cl.
*G06F 1/30* (2006.01)
*G06F 1/26* (2006.01)
*G06F 1/3225* (2019.01)

(52) U.S. Cl.
CPC ................ *G06F 1/30* (2013.01); *G06F 1/263* (2013.01); *G06F 1/3225* (2013.01)

(58) Field of Classification Search
None
See application file for complete search history.

(56) References Cited

U.S. PATENT DOCUMENTS 7,243,248 B1 * 7/2007 Roux ..................... G11B 33/12
7,321,521 B2 * 1/2008 Spengler .............. G11C 29/028 320/132
2005/0168934 A1 * 8/2005 Wendel .................. G11B 33/08 361/724

(Continued)

FOREIGN PATENT DOCUMENTS

CN 201036001 Y 3/2008
CN 104317745 A 1/2015

(Continued)

*Primary Examiner* — Danny Chan
(74) *Attorney, Agent, or Firm* — IPro, PLLC

(57) ABSTRACT

Provided are a power supply method and device for a storage array, and a server. The method includes: acquiring state data for representing power supply state of power modules first; determining, according to the state data, whether the storage array reaches a power failure triggering condition; and when the storage array reaches the power failure triggering condition, controlling the current power module to be switched to other power modules or standby batteries.

19 Claims, 4 Drawing Sheets

(56) References Cited

U.S. PATENT DOCUMENTS

| | | | | |
|---|---|---|---|---|
| 2006/0190747 | A1 * | 8/2006 | Fukumori | G11B 19/08 713/300 |
| 2006/0279869 | A1 * | 12/2006 | Yamamoto | G06F 3/0634 713/300 |
| 2008/0151452 | A1 * | 6/2008 | Ren | G06F 1/26 361/86 |
| 2011/0066884 | A1 * | 3/2011 | Suzuki | G06F 11/1441 714/48 |
| 2014/0229755 | A1 * | 8/2014 | Kris | H02J 1/102 713/340 |
| 2016/0283336 | A1 | 9/2016 | Petersen | |
| 2018/0329468 | A1 * | 11/2018 | Nelson | G06F 11/1441 |
| 2019/0114093 | A1 | 4/2019 | Roeder et al. | |
| 2022/0026970 | A1 * | 1/2022 | Krasner | G06F 11/3034 |

FOREIGN PATENT DOCUMENTS

| | | | | |
|---|---|---|---|---|
| CN | 109460194 | A | 3/2019 | |
| CN | 112653230 | A | 4/2021 | |
| CN | 112803581 | A | 5/2021 | |
| CN | 114415813 | A | 4/2022 | |
| EP | 2065892 | B1 * | 5/2010 | G11B 33/127 |

* cited by examiner

POWER SUPPLY METHOD AND DEVICE FOR STORAGE ARRAY, AND SERVER

CROSS REFERENCE TO RELATED APPLICATIONS

The disclosure claims priority to the Chinese Patent Application No. 202210315458.0, entitled "METHOD AND DEVICE FOR SUPPLYING POWER TO STORAGE ARRAY, AND SERVER", filed to the China National Intellectual Property Administration on Mar. 29, 2022, the entire contents of which are incorporated herein by reference.

TECHNICAL FIELD

The disclosure relates to the field of storage, in particular to a method and a device for supplying power to a storage array, and a server.

BACKGROUND

A storage array needs to be powered by a power module when it is normal operation. FIG. 1 is a schematic diagram of supplying power to a storage array in the related art. As shown in FIG. 1, In the related art, an input from a power grid is connected to an input end of an Active Power Factor Correction (APFC) circuit, an output end of the APFC circuit is connected to a first end of an inverter circuit, a second end of the inverter circuit is connected to an end of a rectifier circuit, a third end of the inverter circuit is connected to a driver circuit, the other end of the rectifier circuit is connected to an end of a control circuit for the power module, the other end of the control circuit is connected to the power module, the power module is connected to the storage array. The APFC circuit and the control circuit may further be provided with controllable switches participating in realizing functions of the APFC circuit and the control circuit. The input from the power grid is converted by the APFC circuit, then subjected to inversion and rectification under the driving of the driver circuit, and output to the control circuit for the power modules, a power module is selected by the control circuit, thereby supplying power to the storage array from the power module.

SUMMARY

Objects of the disclosure are to provide a method and device for supplying power to a storage array, and a server.

In order to solve the above-mentioned technical problems, the disclosure provides a method for supplying power to a storage array, including:

- acquiring state data for representing power supply state of power modules;
- determining, according to the state data, whether the storage array satisfies power failure triggering conditions; and
- controlling a current power module to be switched to another power module or a standby battery in response to determining that the storage array satisfies the power failure triggering conditions.

In some embodiments, the acquiring state data for representing power supply state of power modules includes:

- acquiring power supply data of a power grid, output data of multiple power modules, a control signal for controlling the multiple power modules, temperature data of controllable switches, and driving data for driving the multiple power modules; and the power failure triggering conditions include:

- power supply from the power grid being cut off or a power supply stability threshold of the power grid being smaller than a preset threshold; output of the power modules being stopped, output voltages of the power modules not reaching a minimum power supply voltage required by the storage array or exceeding a maximum power supply voltage of the storage array; the control signal for controlling the multiple power modules disappearing; temperatures of the controllable switches being too high; and abnormal driving of the power modules.

In some embodiments, before the acquiring state data for representing power supply state of power modules, the method further includes:

- determining whether an in-place signal of the storage array is received;
- determining whether the in-place signal of the storage array is an interference signal in response to receiving the in-place signal;
- in response to the signal being the interference signal, returning to the step of determining whether an in-place signal of the storage array is received; and
- in response to the signal being not the interference signal, proceeding to the step of acquiring state data for representing power supply state of power modules.

In some embodiments, the determining whether the in-place signal of the storage array is an interference signal in response to receiving the in-place signal includes:

- in response to the signal being in a low-level state, determining the signal is a non-interference signal; and
- in response to the signal being in a non-low-level state, determining the signal is the interference signal.

In some embodiments, after the acquiring state data for representing power supply state of power modules, the method further includes:

- redetermining a power supply control mode of the storage array according to the state data.

In some embodiments, the redetermining a power supply control mode of the storage array according to the state data includes:

- determining a control algorithm subroutine according to the state data; and
- determining the power supply control mode of the storage array according to the control algorithm subroutine.

In some embodiments, the power supply control mode of the storage array includes:

- distributed logic parallel control, master-slave redundant parallel control or other control mode, wherein the other control mode is a mode initiated when the power supply state of the power modules are determined to be abnormal according to the state data.

In some embodiments, the distributed logic parallel control is a power supply control mode in which the multiple power modules supply power at the same time; and the master-slave redundant parallel control is a power supply control mode in which one of the power modules supplies power alone and other power modules are in a standby state.

In some embodiments, the method further includes:

- in the distributed logic parallel control, adding a current-sharing bus voltage into a proportional-integral-derivative (PID) control loop as a control parameter, and taking the current-sharing bus voltage as a feedforward signal to improve a current-sharing precision when a load is suddenly changed.

In some embodiments, the method further includes:

in response to receiving a primary-standby host configuration instruction in the master-slave redundant parallel control, sending a cold redundant control signal; and in response to receiving a primary-standby slave configuration instruction in the master-slave redundant parallel control, adjusting the output voltage to be lower than a normal output voltage by a preset voltage.

In some embodiments, the output data includes bus output voltages, and after the acquiring state data for representing power supply state of power modules, the method further includes:

performing, according to the state data, a proportional-integral-derivative (PID) control on the multiple power modules through an Active Power Factor Correction (APFC) control subroutine, so that the bus output voltages of the multiple power modules are stable.

In some embodiments, when the power supply control mode is the distributed logic parallel control, the redetermining a power supply control mode of the storage array according to the state data includes:

calling a first algorithm for the distributed logic parallel control; and redetermining the power supply control mode of the storage array according to the first algorithm;

when the power supply control mode is the master-slave redundant parallel control, the determining a power supply control mode of the storage array according to the state data includes:

calling a second algorithm for the master-slave redundant parallel control; and redetermining the power supply control mode of the storage array according to the second algorithm.

In some embodiments, the power supply control mode of the storage array is the other model control; and accordingly, after the redetermining a power supply control mode of the storage array according to the state data, the method further includes:

restoring an anomaly through a self-diagnosis subroutine.

In some embodiments, after the restoring an anomaly through a self-diagnosis subroutine, the method further includes:

determining whether the anomaly is restored;

in response to the anomaly being restored, continuing to supply power for the storage array through the power modules; and in response to the anomaly being not restored, controlling the standby battery to supply power to the storage array, and controlling an alarm module to give an alarm.

In some embodiments, a specific implementation process of supplying power to the storage array by the power modules is as follows:

an input from the power grid is converted by an Active Power Factor Correction (APFC) circuit, then inverted and rectified driven by a driver circuit, output to a control circuit for the power modules, the power modules are selected by the control circuit, and the power modules supply power for the storage array.

In some embodiments, the acquiring power supply data of a power grid, output data of multiple power modules, a control signal for controlling the multiple power modules, temperature data of controllable switches, and driving data for driving the multiple power modules includes:

acquiring, by a sampling module in a circuit, the power supply data of the power grid, the output data of the multiple power modules, the control signal for controlling the multiple power modules and the temperature data of the controllable switches, wherein the sampling module is connected to a processor; and acquiring, by the processor, the driving data for driving the multiple power modules.

In some embodiments, the acquiring, by a sampling module in a circuit, the power supply data of the power grid, the output data of the multiple power modules, the control signal for controlling the multiple power modules and the temperature data of the controllable switches includes:

collecting the power supply data of the power grid by a current sampling, and/or a voltage sampling, and/or a frequency sampling for the input from the power grid;

collecting the output data of the multiple power modules by the current sampling, and/or the voltage sampling; and collecting the temperature data of the controllable switches by a temperature sensor.

In some embodiments, the method further includes:

adding a first protection circuit for preventing static electricity and hot-drawing from damaging a power control signal pin, a second protection circuit for eliminating a power on sequence and a third protection circuit for eliminating software delay impacts in a circuit.

In order to solve the above-mentioned technical problems, the disclosure further provides a device for supplying power to a storage array, including:

a memory for storing computer programs; and a processor for executing the computer programs to implement the steps of the method for supplying power to a storage array.

In order to solve the above-mentioned technical problems, the disclosure further provides a server, including the above-mentioned power supply device for the storage array.

BRIEF DESCRIPTION OF THE DRAWINGS

The accompanying drawings, which are incorporated in and constitute a part of the present description, illustrate embodiments consistent with the disclosure and serve to explain the principle of the disclosure together with the description.

To describe the technical solutions in the embodiments of the disclosure more clearly, the accompanying drawings required for describing the related art and the embodiments will be briefly introduced below. Apparently, the accompanying drawings in the following descriptions show only some embodiments of the disclosure, and those of ordinary skill in the art may still derive other accompanying drawings from these accompanying drawings without creative efforts.

DETAILED DESCRIPTION OF THE EMBODIMENTS

Cores of the disclosure are to provide a method and device for supplying power to a storage array, and a server, by which the risk of power failure of the storage array is reduced, and the data security is improved.

In order to make objects, technical solutions and advantages of the embodiments of the disclosure clearer, the technical solutions in the embodiments of the disclosure will be described clearly and thoroughly below in conjunction with the accompanying drawings in the embodiments of the disclosure. Apparently, the described embodiments are a part, but not all, of the embodiments of the disclosure. Based on the described embodiments of the disclosure, all other embodiments obtained by those of ordinary skill in the art without creative efforts shall fall within the protective scope of the disclosure.

In the related art, after it is found that the storage array is abnormally powered down, a standby battery can be switched to supply power to the storage array under the control of a processor. However, since the storage array has been powered down at this moment, that is, the standby battery is switched to supply power after the storage array is powered down, data of the storage array might have been lost, which increases the risk of data loss.

Figure 1:
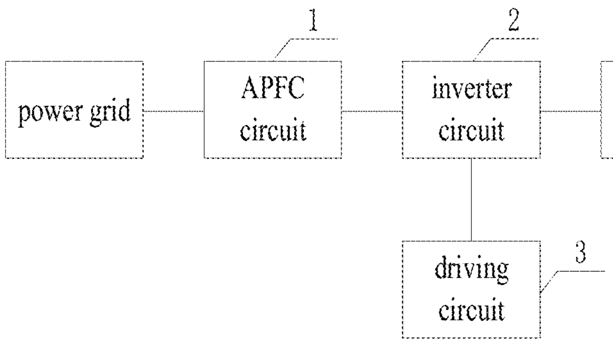
FIG. 1 is a schematic diagram of supplying power to a storage array in the related art.
Figure 2:
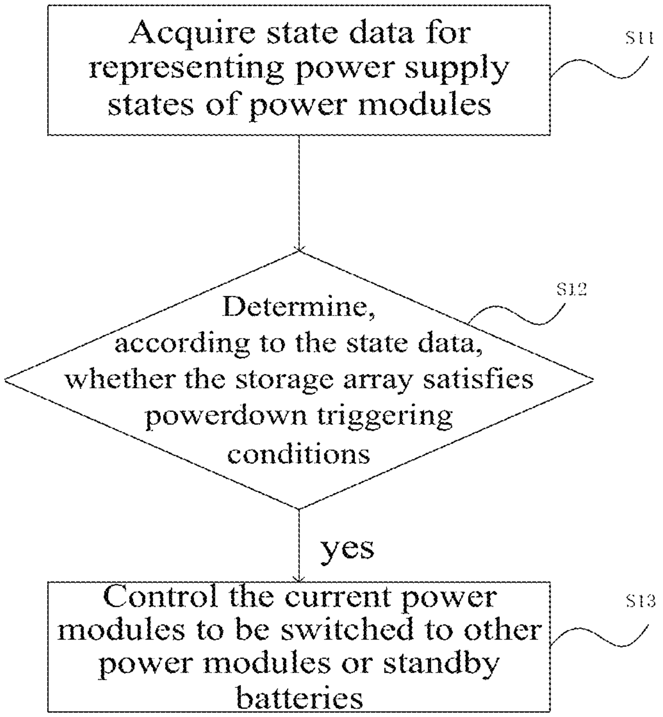
FIG. 2 is a flow diagram of a method for supplying power to a storage array provided in the disclosure.

FIG. 2 is a flow diagram of a method for supplying power to a storage array provided in the disclosure, as shown in FIG. 2, the method includes steps described below.

At S11, state data for representing power supply state of power modules is acquired.

At S12, it is determined, according to the state data, whether the storage array satisfies power failure triggering conditions, and if the storage array satisfies the power failure triggering conditions, the process proceeds to S13.

At S13, a current power module is controlled to be switched to another power module or a standby battery.

If a storage array is abnormally powered down while being powered by a power module, data stored in the storage array will be lost. However, if a power module or standby battery that is available for supplying power normally are provided for the storage array before the storage array is powered down, the storage array will not be powered down, and will continue to operate. In the disclosure, by acquiring the state data for representing the power supply state of the power modules, determining, according to the state data, whether the storage array satisfies the power failure triggering conditions, and controlling the current power module to be switched to another power module or standby battery under the condition that the storage array satisfies the power failure triggering conditions, power is continued to be supplied for the storage array before the storage array is powered down, so that the storage array continues to work, which reduces the risk of the storage array being powered down, and improves the data security.

The state data for representing the power supply state of the power modules is acquired first. The state data refers to data for representing the power supply state of the power modules. The state data may be data about the power module per se, or other data, for example all data that can represent the power supply state of the power module on a transmission path between an input from a power grid and the power module, through which the power supply state of the power modules can also be reflected. Then, if the state data of the power supply state of the power module satisfies the power failure triggering conditions, which means that the storage array will be powered down shortly, or there is a greater possibility that powerdown occurs, then the current power module is switched to another power module or standby battery without faults according to specific situations of the state data. Accordingly, the reliability of the solution is improved.

It should be noted that the power failure triggering conditions are met before the storage array is powered down, so the power module and standby power source is switched for the storage array before the storage array is powered down. Accordingly, the reliability of the solution is improved.

The disclosure provides a method for supplying power to a storage array, including: acquiring state data for representing power supply state of power modules first; determining, according to the state data, whether the storage array satisfies power failure triggering conditions; and controlling the current power module to be switched to another power module or standby battery under the condition that the storage array satisfies the power failure triggering conditions. By adopting the present solution, when the storage array satisfies the power failure triggering conditions, another power module or standby battery without anomalies can be switched in time to continue to supply power to the storage array, so that power is supplied to the storage array continuously, thereby reducing the risk of the storage array being powered down, and improving the data security.

Figure 3:
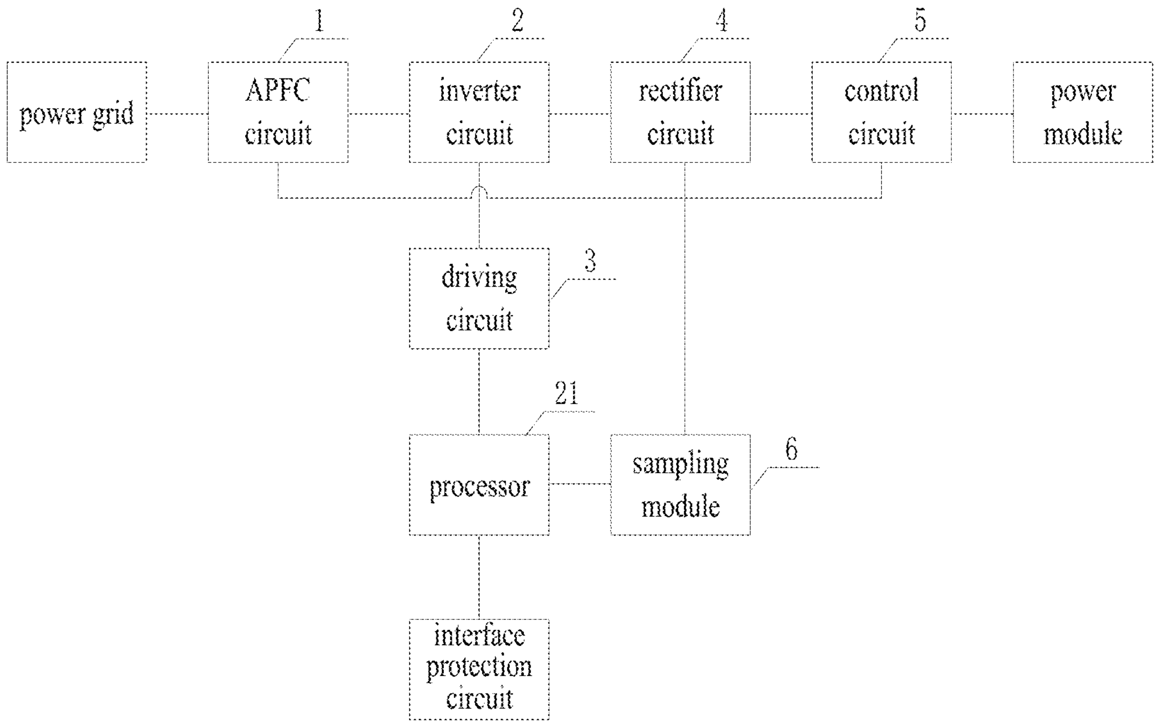
FIG. 3 is a schematic diagram of supplying power to a storage array provided in the disclosure.
Figure 4:
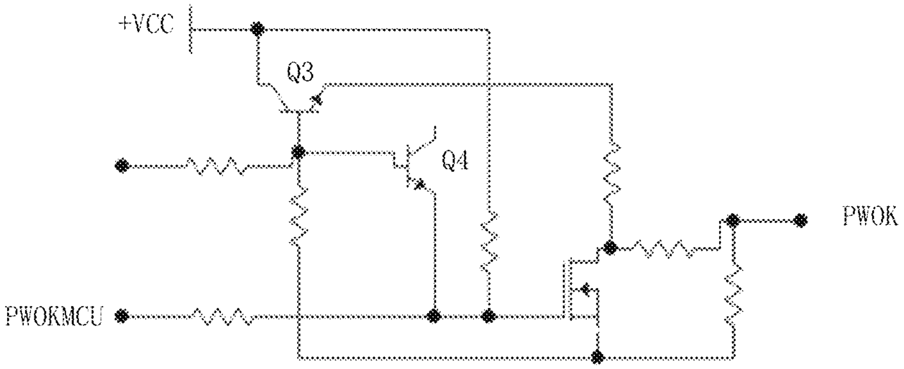
FIG. 4 is a schematic structural diagram of an interface protection circuit provided in the disclosure.
Figure 5:
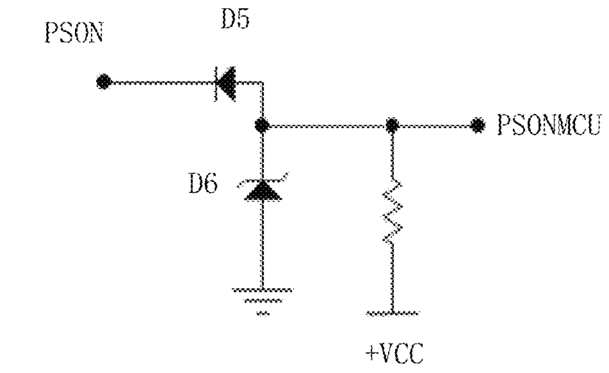
FIG. 5 is a schematic structural diagram of another interface protection circuit provided in the disclosure.
Figure 6:
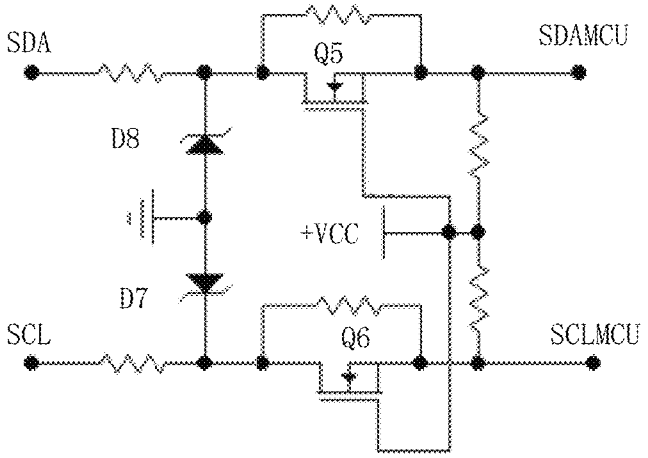
FIG. 6 is a schematic structural diagram of another interface protection circuit provided in the disclosure.
Figure 7:
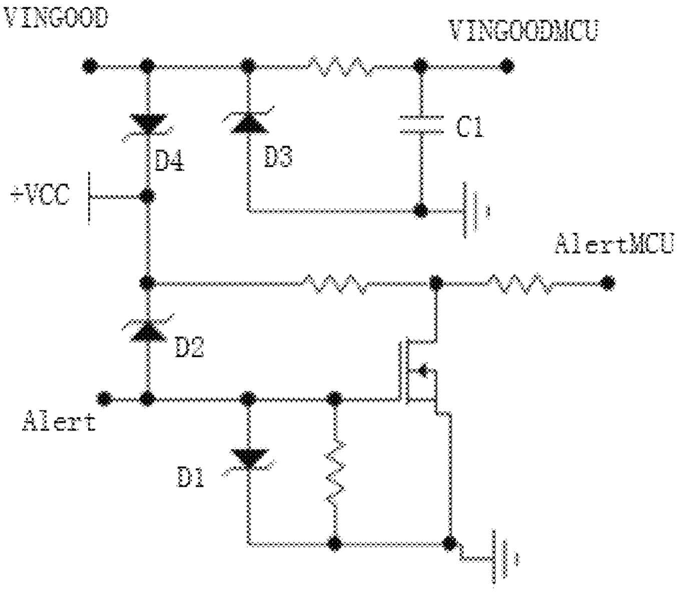
FIG. 7 is a schematic structural diagram of another interface protection circuit provided in the disclosure.

On the basis of the above embodiment, reference is made to FIG. 3, FIG. 4, FIG. 5, FIG. 6, and FIG. 7. FIG. 3 is a schematic diagram of supplying power to a storage array provided in the disclosure, FIG. 4 is a schematic structural diagram of an interface protection circuit provided in the disclosure, FIG. 5 is a schematic structural diagram of another interface protection circuit provided in the disclosure, FIG. 6 is a schematic structural diagram of another interface protection circuit provided in the disclosure, and FIG. 7 is a schematic structural diagram of another interface protection circuit provided in the disclosure.

In some embodiments, the step in which state data for representing power supply state of the power modules is acquired includes:

acquiring power supply data of a power grid, output data of multiple power modules, a control signal for controlling the multiple power modules, temperature data of a controllable switch and driving data for driving the multiple power modules;

the power failure triggering conditions include:

power supply from the power grid being cut off or a power supply stability threshold of the power grid being smaller than a preset threshold, output of the power module being stopped, an output voltage of the power module not reaching the minimum power supply voltage required by the storage array or exceeding the maximum power supply voltage of the storage array, the control signals for controlling the multiple power modules disappearing, the temperature of the controllable switch being too high, and abnormal driving of the power module.

A specific implementation of supplying power to the storage array by the power modules is as follows: an input from the power grid is converted by an APFC circuit 1, then inverted and rectified driven by a driver circuit 3, output to a control circuit 5 for the power modules, and the control circuit 5 selects a power module to supply power to the storage array. Controllable switches participate in realizing functions of the APFC circuit 1 and the control circuit 5. Data in an intermediate process from the input from the power grid to the power modules includes the power supply data of the power grid, the output data of the multiple power modules, the control signal for controlling the multiple power modules, the temperature data of the controllable switches and the driving data for driving the multiple power modules, all of these data can be used for reflecting the power supply state of the power modules. If an issue that affects the power module to supply power to the storage array exists in any one of circuits between the input from the power grid and the power module, it is considered that the storage array will be powered down shortly, then, another power module or standby battery is switched to supply power to the storage array before the storage array is powered down, thereby improving the reliability of the solution.

The input from the power grid is connected to an input end of the APFC circuit 1, an output end of the APFC circuit 1 is connected to a first end of an inverter circuit 2, a second end of the inverter circuit 2 is connected to an end of a rectifier circuit 4, a third end of the inverter circuit 2 is connected to the driver circuit 3, the other end of the rectifier circuit 4 is connected to an end of the control circuit 5 for the power modules, the other end of the control circuit 5 is connected to the power modules, the power modules are connected to the storage array, the controllable switches are further disposed in the APFC circuit 1 and the control circuit 5, thereby improving the integrity of the solution.

In addition, when the driving data for driving the multiple power modules is acquired, the data of the driver circuit 3 is directly acquired by a processor 21 to determine whether the driver circuit 3 is abnormal. Other data, for example the power supply data of the power grid, the output data of the multiple power modules, the control signal for controlling the multiple power modules and the temperature data of the controllable switches, are acquired by a sampling module 6 in the circuitry. The sampling module 6 is connected to the processor 21, the sampling module 6 may include different types of samplings. For example, if the power supply data of the power grid is collected, current sampling, voltage sampling and frequency sampling for the input from the power grid can be adopted; if the output data of the multiple power modules is collected, current sampling and voltage sampling can be adopted; if the temperature data of the controllable switches is collected, a temperature sensor can be adopted. The sampling module 6 herein may be adaptively changed according to a type of data desired to be collected, thereby improving the flexibility and feasibility of the solution.

According to specific situations of the acquired power supply data of the power grid, the output data of the multiple power modules, the control signal for controlling the multiple power modules, the temperature data of the controllable switches, and the driving data for driving the multiple power modules, it can be analyzed whether there is a problem and whether it is required to switch a power module and a standby battery for the storage array. The power failure triggering conditions include: the power supply from the power grid being cut off or the power supply stability threshold being smaller than the preset threshold, the output of the power modules being stopped, the output voltage of the power module not reaching the minimum power supply voltage required by the storage array or exceeding the maximum power supply voltage of the storage array, the control signals for controlling the multiple power modules disappearing, the temperature of the controllable switch being too high, and abnormal driving of the power module. For the power supply from the power grid, there may be a power supply voltage of 220 volts, a power supply voltage of 110 volts or other power supply voltages in different countries. If the power grid for supplying power is faulted, none of the power modules will supply power any more, and it is switched to the standby battery to supply power; if a voltage of the power grid is instable, the power supply stability threshold is smaller than the preset threshold, that is, the power supply stability threshold is smaller than a stability value required by the power modules and the storage array, which may also result in the powerdown of the storage array, at this time, it is also necessary to switch to the standby battery; and when the output data of the multiple power modules, the control signal for controlling the multiple power modules and the driving data for driving the multiple power modules are abnormal, the storage array may also be powered down abnormally. Accordingly, the reliability and integrity of the solution are improved.

The controllable switches disposed in the APFC circuit 1 and the control circuit 5 belong to key components in the circuit. When temperatures of these components are too high, the storage array may also be powered down; Moreover, when the circuit is abnormal, the temperatures of the key components are more easily changed. Thus, by detecting temperature changes of the key components, whether power supply for the storage array is abnormal can be better reflected, thereby improving the reliability of the solution.

In addition, in the disclosure, a plurality of protection circuits are added in the circuit, and a first Transient Voltage Suppressor (TVS) D1, a second TVS D2, a third TVS D3, a fourth TVS D4, a fifth TVS D5, a sixth TVS D6, a seventh TVS D7 and an eighth TVS D8 are added TVSs, which prevent static electricity and hot-drawing from damaging a power control signal pin. A fifth switching tube Q5, a sixth switching tube Q6 and the control circuit 5 are used for eliminating impacts of a power on sequence on Power Management Units (PMUS), thereby preventing an abnormal power source from affecting a Power Management Bus (PMBUS) link of a storage system, and achieving the object of real redundant power supply. An intelligent Power ok (PWOK) signal is abnormal when a voltage of the control circuit 5 is 12 volts, the abnormal PWOK signal is sent within the first time, and thus, software delay impacts are eliminated.

The first TVS D1, the second TVS D2, the third TVS D3, the fourth TVS D4, the fifth TVS D5, the sixth TVS D6, the seventh TVS D7 and the eighth TVS D8 as TVSs are added into the circuit to play a role in protecting the circuit, thereby protecting an interface signal, preventing a backflow from affecting the circuit, and protecting the circuit. Therefore, the safety of the circuit is improved.

The seventh TVS D7 and the eighth TVS D8 can suppress impacts of a transient voltage caused by lightning stroke, static electricity, etc. on a Serial Data Line/Serial Clock Line (SDA/SCL) link. The fifth switching tube Q5 and the sixth switching tube Q6 prevent an abnormal power module from affecting a system communication link. The fourth TVS D4 and the third TVS D3 suppress impacts of the transient voltage caused by lightning stroke, static electricity, etc. on a Vin good signal. A fourth resistor R4 and a first capacitor C1 form a Rc filter circuit. A third switching tube Q3 and a fourth switching tube Q4 form an OR gate. A working state of a power source is jointly monitored by means of hardware and software. The sixth TVS D6 can suppress impacts of the transient voltage caused by lightning stroke, static electricity, etc. on a PSON signal. The fifth TVS D5 functions as a camping diode to protect a Mcu pin.

In some embodiments, before the state data for representing power supply state of power modules is acquired, the method further includes:

- determining whether an in-place signal of the storage array is received;
- in response to receiving the in-place signal of the storage array, determining whether the signal is an interference signal;
- in response to the signal being the interference signal, returning to the step of determining whether an in-place signal of the storage array is received; and
- in response to the signal being not the interference signal, proceeding to the step in which state data for representing power supply state of power modules is acquired.

From the view of the software, when the storage array is connected to the power modules, the processor 21 receives the in-place signal of the storage array, at the same time, detection software filter dithering elimination is performed on a PSON (Power Supply On) signal by means of a PSON dithering elimination determination subroutine, it is determined whether the signal is the interference signal. If it is detected that the PSON signal has a low level, the power modules start to work normally, which indicates that the signal at this moment is not the interference signal. If a non-low-level state is detected, an initial flow of a main program is returned to continue to detect the PSON signal, which indicates that the signal is an interference signal triggered by mistake, rather than a real in-place signal, then the process returns to the step that it is determined whether an in-place signal of the storage array is received to continue to perform determination; and if the signal is not the interference signal, the step that state data for representing power supply state of power modules is acquired is performed to facilitate subsequent steps, thereby improving the reliability of the solution.

In some embodiments, after the state data for representing power supply state of power modules is acquired, the method further includes:

- redetermining a power supply control mode of the storage array according to the state data.

After the power modules are connected to the storage array, a power supply control mode suitable for the storage array is redetermined according to the state data, an intelligent switching may be performed, thereby improving the reliability and the degree of automation of the solution.

From the view of the software, the state data is intelligently analyzed by means of a power supply mode determination subroutine, different control algorithm subroutines are called according to the analysis result, a subroutine corresponding to the storage array is selected in conjunction with the state data, and thus, the power supply efficiency is increased. Since an appropriate power supply control mode is selected for the storage array, electric energy can also be saved, and resource waste is avoided.

In some embodiments, the power supply control mode of the storage array includes:

- distributed logic parallel control, master-slave redundant parallel control or other control mode, and the other control mode is a mode initiated when the power supply state of the power modules are determined to be abnormal according to the state data.

The multiple power modules may have different power supply control modes, among them, the distributed logic parallel control means that the multiple power modules supply power at the same time; and the master-slave redundant parallel control means that one of the power modules supplies power alone and other power modules are in a "standby" state, so that electric energy can be saved.

From the view of the software, a current-sharing bus voltage is added, by a current-sharing control subroutine, into a proportional-integral-derivative (PID) control loop as a control parameter, and the current-sharing bus voltage is also used as a feedforward signal to improve the current-sharing precision when a load is suddenly changed. In response to receiving a primary-standby host configuration instruction, a primary-standby control subroutine sends a cold redundant control signal; in response to receiving a primary-standby slave configuration instruction, the primary-standby control subroutine adjusts the output voltage to be lower than a normal output voltage by 0.3 volts, thereby ensuring the power supply mode of the master-slave redundant parallel control.

From the view of the software, it should be noted that the distributed logic parallel control is equivalent to the current-sharing control subroutine, and the master-slave redundant parallel control is equivalent to the primary-standby control subroutine.

In some embodiments, the output data includes bus output voltages, and after the state data for representing power supply state of power modules is acquired, the method further includes:

- performing, according to the state data, a PID control on the multiple power modules through an Active Power Factor Correction (APFC) control subroutine, so that the bus output voltages of the multiple power modules are stable.

When the multiple power modules supply power, from the view of the software, the PID control may be performed, according to the state data, through the APFC control subroutine; the output data of the power modules includes the bus output voltages; by performing the PID control on the multiple power modules, the bus output voltages of the power modules can be stabilized. For example, if a 12 V voltage is required for normal operations of the storage array, the bus output voltages of the power modules can be stabilized through the PID control; outputs of the power modules may be fluctuated to a certain extent in a normal case, by performing the PID control on the multiple power modules, fluctuations can be reduced, and the voltages can be stabilized at 12 volts, so that higher reliability is achieved during supplying power for the storage array, and the feasibility of the solution is improved.

In some embodiments, when the power supply control mode is the distributed logic parallel control, the power supply control mode of the storage array is redetermined according to the state data by:

- calling a first algorithm for the distributed logic parallel control; and
- redetermining the power supply control mode of the storage array according to the first algorithm.

When the power supply control mode is the master-slave redundant parallel control, the power supply control mode of the storage array is redetermined according to the state data by:

- calling a second algorithm for the master-slave redundant parallel control; and
- redetermining the power supply control mode of the storage array according to the second algorithm.

Different intelligent control algorithms are called in different power supply modes to ensure the precision of power parameters in different working modes. When the power supply control mode is the distributed logic parallel control, the first algorithm for the distributed logic parallel control is called, and the power supply control mode of the storage array is redetermined according to the first algorithm, so that a power supply control mode suitable for the storage array is determined, thereby ensuring the precision of the power parameters at the moment; when the power supply control mode is the master-slave redundant parallel control, the second algorithm for the master-slave redundant parallel control is called, and the power supply control mode of the storage array is redetermined according to the second algorithm, so that a power supply control mode suitable for the storage array is determined, thereby ensuring the precision of the power parameters at the moment. By calling different intelligent control algorithms according to the corresponding different power supply modes, the precision of the power parameters at the moment can be ensured, and the reliability of the solution is improved.

In some embodiments, the power supply control mode of the storage array is the other model control. Accordingly, after the power supply control mode of the storage array is redetermined according to the state data, the method further includes:

restoring an anomaly through a self-diagnosis subroutine;

determining whether the anomaly is restored;

in response to the anomaly being restored, continuing to supply power to the storage array through the power modules; and in response to the anomaly being not restored, controlling the standby battery to supply power to the storage array, and controlling an alarm module to give an alarm.

When the power supply control mode of the storage array is the other model control, it means that power supply for the storage array at the moment has been abnormal, the standby battery is ready for supplying power. When the power supply control mode of the storage array is redetermined as the other model control according to the state data, from the view of the software, the anomaly is restored through the self-diagnosis subroutine, and the process is a process of trying for restoring; if the anomaly may be solved from the view of the software of the processor 21, the anomaly can be restored, power is continued to be supplied for the storage array through the power modules; and if the anomaly cannot be restored, it means that the anomaly is a problem of hardware or other relatively complex problems, at the moment, the standby battery is controlled to supply power to the storage array, and the alarm module is controlled to give an alarm. First, it is ensured that the storage array is not powered down, so that the reliability of power supply and the safety of stored data are ensured; and then, the alarm module is controlled to give an alarm at the same time, so that it is convenient for a user to find problems in time and perform corresponding maintenance. The standby battery has a certain service life. The power modules can be reutilized to supply power after being maintained, and thus, the integrity of the solution is improved.

From the view of the software, the result is intelligently analyzed, according to a working state of a power supply and key parameters, through a self-diagnosis restore subroutine, an interface signal of the working state of the power supply is sent by intelligent control, at the same time, a power supply state register is updated according to an intelligent analysis result, and three attempts for restoring an abnormal state are made, so that the reliability of the solution is improved.

Figure 8:
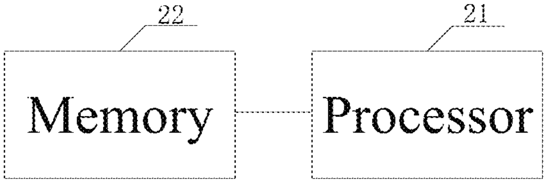
FIG. 8 is a schematic structural diagram of a device for supplying power to a storage array provided in the disclosure.

FIG. 8 is a schematic structural diagram of a device for supplying power to a storage array provided in the disclosure.

The disclosure further provides a device for supplying power to a storage array, including:

a memory 22, configured to store a computer program; and a processor 21, configured to execute the computer program to implement the steps of the above-mentioned method for supplying power to the storage array.

The introduction for the power supply apparatus for the storage array provided in the disclosure refers to the embodiment of the above-mentioned power supply method for the storage array so as to be no longer repeated herein.

The disclosure further provides a server, including the above-mentioned device for supplying power to the storage array.

The introduction for the server provided in the disclosure refers to the embodiment of the above-mentioned power supply apparatus for the storage array so as to be no longer repeated herein.

Various embodiments in this specification is described in a progressive manner. Each embodiment focuses on differences from other embodiments. The same and similar parts between the various embodiments may be referred to each other. As for the device disclosed in the embodiment, since it corresponds to the method disclosed in the embodiment, the description is relatively simple. For relevant details, please refer to the description in the method section.

Those skilled in the art may further realize that the units and algorithm steps of each example described in connection with the embodiments disclosed herein may be implemented by electronic hardware, computer software, or a combination of both. In order to clearly illustrate the interchangeability of hardware and software, in the above description, the composition and steps of each example have been generally described according to functions. Whether these functions are performed in hardware or software depends on the specific application and design constraints of the technical solution. Those skilled may implement the described functionality using different methods for each specific application, but such implementations should not be considered beyond the scope of the disclosure.

The invention claimed is:

1. A method for supplying power to a storage array, comprising:

acquiring state data for representing power supply state of power modules;

determining, according to the state data, whether the storage array satisfies power failure triggering conditions; and controlling a current power module to be switched to another power module or a standby battery in response to determining that the storage array satisfies the power failure triggering conditions;

wherein the acquiring state data for representing power supply state of power modules comprises:

acquiring power supply data of a power grid, output data of multiple power modules, a control signal for controlling the multiple power modules, temperature data of controllable switches, and driving data for driving the multiple power modules; and the power failure triggering conditions comprise:

power supply from the power grid being cut off or a power supply stability threshold of the power grid being smaller than a preset threshold; output of the power modules being stopped, output voltages of the power modules not reaching a minimum power supply voltage required by the storage array or exceeding a maximum power supply voltage of the storage array; the control signal for controlling the multiple power modules disappearing; temperatures of the controllable switches being too high; and abnormal driving of the power modules.

2. The method for supplying power to the storage array according to claim 1, wherein before the acquiring state data for representing power supply state of power modules, the method further comprises:

determining whether an in-place signal of the storage array is received;

determining whether the received in-place signal of the storage array is an interference signal;

in response to the received in-place signal being the interference signal, returning to the step of determining whether an in-place signal of the storage array is received; and in response to the received in-place signal being not the interference signal, proceeding to the step of acquiring state data for representing power supply state of power modules.

3. The method for supplying power to the storage array according to claim 2, wherein the determining whether the received in-place signal of the storage array is an interference signal comprises:

in response to PSON signal being in a low-level state, determining the received in-place signal is a non-interference signal; and in response to the PSON signal being in a non-low-level state, determining the received in-place signal is the interference signal.

4. The method for supplying power to the storage array according to claim 1, wherein after the acquiring state data for representing power supply state of power modules, the method further comprises:

redetermining a power supply control mode of the storage array according to the state data.

5. The method for supplying power to the storage array according to claim 4, wherein the redetermining a power supply control mode of the storage array according to the state data comprises:

determining a control algorithm subroutine according to the state data; and determining the power supply control mode of the storage array according to the control algorithm subroutine.

6. The method for supplying power to the storage array according to claim 4, wherein the power supply control mode of the storage array comprises:

distributed logic parallel control, master-slave redundant parallel control or other control mode, wherein the other control mode is a mode initiated when the power supply state of the power modules are determined to be abnormal according to the state data.

7. The method for supplying power to the storage array according to claim 6, wherein the distributed logic parallel control is a power supply control mode in which the multiple power modules supply power at the same time; and the master-slave redundant parallel control is a power supply control mode in which one of the power modules supplies power alone and other power modules are in a standby state.

8. The method for supplying power to the storage array according to claim 6, further comprising:

in the distributed logic parallel control, adding a current-sharing bus voltage into a proportional-integral-derivative (PID) control loop as a control parameter, and taking the current-sharing bus voltage as a feedforward signal to improve a current-sharing precision when a load is suddenly changed.

9. The method for supplying power to the storage array according to claim 6, further comprising:

in response to receiving a primary-standby host configuration instruction in the master-slave redundant parallel control, sending a cold redundant control signal; and in response to receiving a primary-standby slave configuration instruction in the master-slave redundant parallel control, adjusting the output voltage to be lower than a normal output voltage by a preset voltage.

10. The method for supplying power to the storage array according to claim 1, wherein the output data comprises bus output voltages, and after the acquiring state data for representing power supply state of power modules, the method further comprises:

performing, according to the state data, a proportional-integral-derivative (PID) control on the multiple power modules through an Active Power Factor Correction (APFC) control subroutine, so that the bus output voltages of the multiple power modules are stable.

11. The method for supplying power to the storage array according to claim 6, wherein when the power supply control mode is the distributed logic parallel control, the redetermining a power supply control mode of the storage array according to the state data comprises:

calling a first algorithm for the distributed logic parallel control; and redetermining the power supply control mode of the storage array according to the first algorithm;

when the power supply control mode is the master-slave redundant parallel control, the redetermining a power supply control mode of the storage array according to the state data comprises:

calling a second algorithm for the master-slave redundant parallel control; and redetermining the power supply control mode of the storage array according to the second algorithm.

12. The method for supplying power to the storage array according to claim 6, wherein the power supply control mode of the storage array is the other model control; after the redetermining a power supply control mode of the storage array according to the state data, the method further comprises:

restoring an anomaly through a self-diagnosis subroutine.

13. The method for supplying power to the storage array according to claim 12, wherein after the restoring an anomaly through a self-diagnosis subroutine, the method further comprises:

determining whether the anomaly is restored;

in response to the anomaly being restored, continuing to supply power for the storage array through the power modules; and in response to the anomaly being not restored, controlling the standby battery to supply power to the storage array, and controlling an alarm module to give an alarm.

14. The method for supplying power to the storage array according to claim 1, wherein an implementation process of supplying power to the storage array by the power modules is as follows:

an input from the power grid is converted by an Active Power Factor Correction (APFC) circuit, then inverted and rectified driven by a driver circuit, output to a control circuit for the power modules, the power modules are selected by the control circuit, and the power modules supply power for the storage array.

15. The method for supplying power to the storage array according to claim 1, wherein the acquiring power supply data of a power grid, output data of multiple power modules, a control signal for controlling the multiple power modules, temperature data of controllable switches, and driving data for driving the multiple power modules comprises:

acquiring, by a sampling module in a circuit, the power supply data of the power grid, the output data of the multiple power modules, the control signal for controlling the multiple power modules and the temperature data of the controllable switches, wherein the sampling module is connected to a processor; and acquiring, by the processor, the driving data for driving the multiple power modules.

16. The method for supplying power to the storage array according to claim 15, wherein the acquiring, by a sampling module in a circuit, the power supply data of the power grid, the output data of the multiple power modules, the control signal for controlling the multiple power modules and the temperature data of the controllable switches comprises:

collecting the power supply data of the power grid by at least one of a current sampling, a voltage sampling, a frequency sampling for the input from the power grid;

collecting the output data of the multiple power modules by at least one of the current sampling, and the voltage sampling; and collecting the temperature data of the controllable switches by a temperature sensor.

17. The method for supplying power to the storage array according to claim 1, further comprising:

adding a first protection circuit for preventing static electricity and hot-drawing from damaging a power control signal pin, a second protection circuit for eliminating a power on sequence and a third protection circuit for eliminating software delay impacts in a circuit.

18. A device for supplying power to a storage array, comprising:

a memory configured to store a computer program; and a processor configured to execute the computer program to implement operations of:

acquiring state data for representing power supply state of power modules;

determining, according to the state data, whether the storage array satisfies power failure triggering conditions; and controlling a current power module to be switched to another power module or a standby battery in response to determining that the storage array satisfies the power failure triggering conditions;

wherein the acquiring state data for representing power supply state of power modules comprises:

acquiring power supply data of a power grid, output data of multiple power modules, a control signal for controlling the multiple power modules, temperature data of controllable switches, and driving data for driving the multiple power modules; and the power failure triggering conditions comprise:

power supply from the power grid being cut off or a power supply stability threshold of the power grid being smaller than a preset threshold; output of the power modules being stopped, output voltages of the power modules not reaching a minimum power supply voltage required by the storage array or exceeding a maximum power supply voltage of the storage array; the control signal for controlling the multiple power modules disappearing; temperatures of the controllable switches being too high; and abnormal driving of the power modules.

19. A server, comprising the device for supplying power to the storage array according to claim 18.

* * * * *